Figure 2:
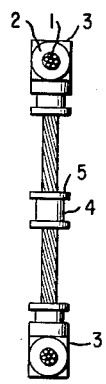

Sept. 7, 1965    J. J. KERLEY, JR    3,204,943
VIBRATION ABSORBING FORCE TRANSMITTING STRUCTURES
Filed Jan. 21, 1963    2 Sheets-Sheet 1

INVENTOR.
JAMES J. KERLEY, JR
BY
Burns, Doane, Benedict,
Swecker and Mathis
ATTORNEYS Sept. 7, 1965   J. J. KERLEY, JR   3,204,943
VIBRATION ABSORBING FORCE TRANSMITTING STRUCTURES
Filed Jan. 21, 1963   2 Sheets-Sheet 2
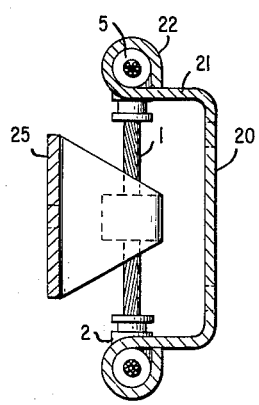
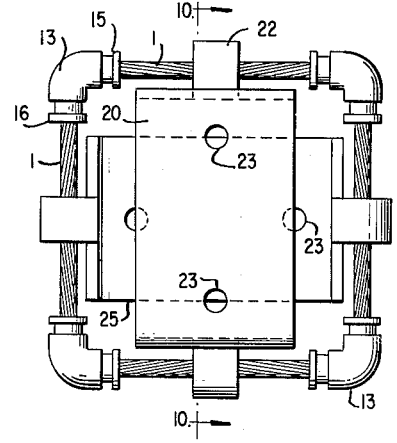
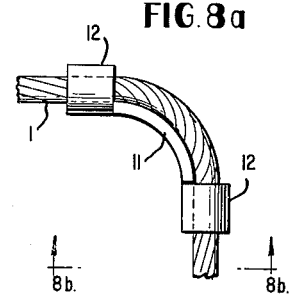
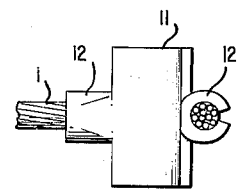
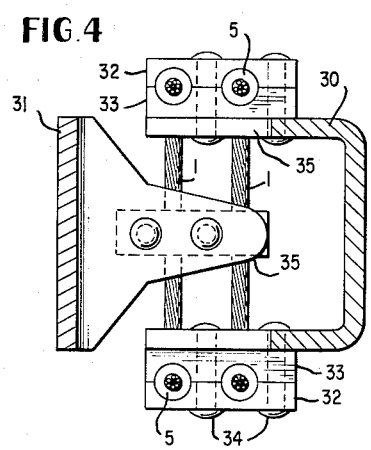
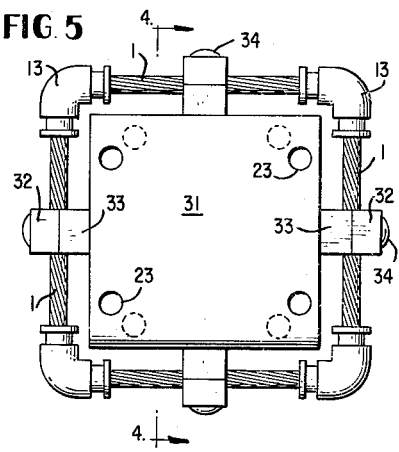
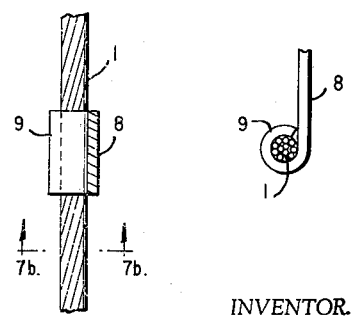
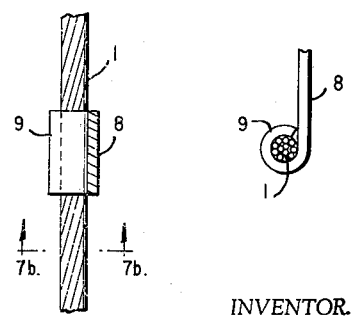
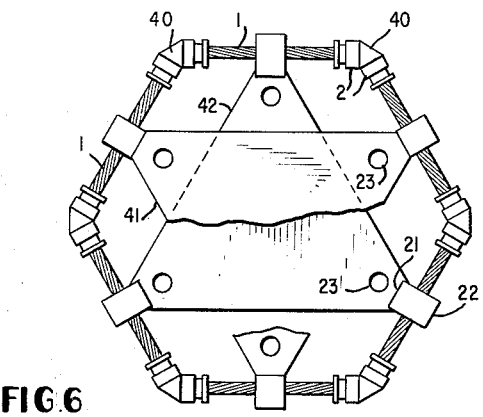
INVENTOR.
JAMES J. KERLEY, JR.
BY
ATTORNEYS United States Patent Office 3,204,943
Patented Sept. 7, 1965

3,204,943
VIBRATION ABSORBING FORCE TRANS-
MITTING STRUCTURES
James J. Kerley, Jr., Cheverly, Md., assignor, by mesne
assignments, to Isolation Systems, Inc., Detroit, Mich.,
a corporation of Michigan
Filed Jan. 21, 1963, Ser. No. 252,709
6 Claims. (Cl. 267—1)

The present invention is directed to the problem of absorbing vibrational components of a composite force including steady state mechanical force components. In present mechanical technology, this problem is almost always present when mechanical movement of physical structures is encountered. Thus, almost all motive power sources generate undesired vibrational energy, moving mechanical elements of machines are rarely perfectly balanced, and in fact, complete machines in general generate and transmit vibrational energy to surrounding or supporting structures. Furthermore, in the generation of rotational energy it is unusual that harmonic or random angular velocity components are not present, which constitute torque noise that is highly desirable to attenuate while transmitting the rotational energy.

Structures of the present invention are universally applicable to these and other related problems and constitute highly efficient instruments of extremely broad application in noise and vibrational energy attenuation.

It is the object of the present invention to provide structures for attenuating vibrational energy and transmitting steady state force components, of broad application in mechanical engineering, highly efficient operation, and great facility for manufacture in large quantities.

The further object of the present invention is to provide a vibration absorbing structure applicable to machine mounts and torque transmitters.

The instant invention is directed to the application of multistrand resilient cable to vibration absorption and force transmission. Vibrational forces may be absorbed by multistrand resilient cable elements when applied thereto with a vector component transverse to the longitudinal cable axis. In the configuration of elements employed in the present invention, I provide an even plurality of free cable elements connected at their ends to form a closed polygonal array in which alternate connecting means position the adjacent free cable portions at common angles substantially less than 180°. Thus, longitudinal vibrational force components are applied to the adjacent cable section with a transverse component to be attenuated therein.

In particular, I have discovered that such a square cable configuration is directly applicable to the fabrication of vibration absorbing mountings and shaft couplings of very broad application in mechanical engineering. These cable arrangements may be directly applied to machine frames and supporting elements or they may be fabricated with attached mounting plates for installation between supporting and supported structures. In all instances, the structures of the present invention are designed to sustain steady state forces by transverse cable deflection under circumstances in which the cable operates in shear.

Mounts of the present invention may, as is frequently desired, be designed to afford substantially the same deflection to load characteristics in three principal planes. For other applications, by specific arrangement of the cable elements in regard to the direction of cable twist, asymmetrical hysteresis characteristics on opposite sides of the equilibrium position of the structure may be achieved.

Figure 1:
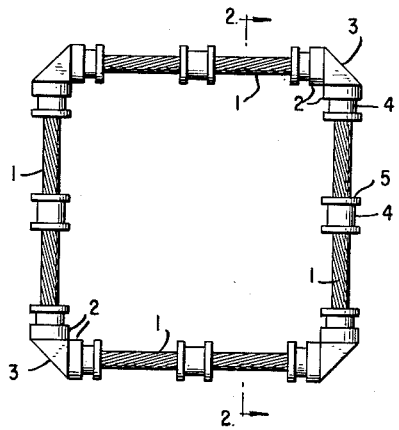
Figure 3:
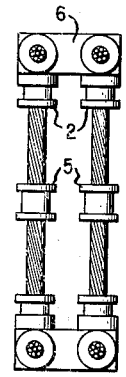
Figure 11:
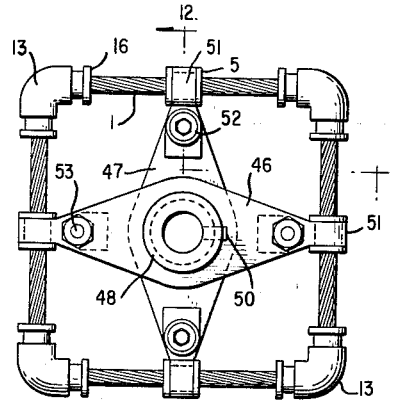
Figure 12:
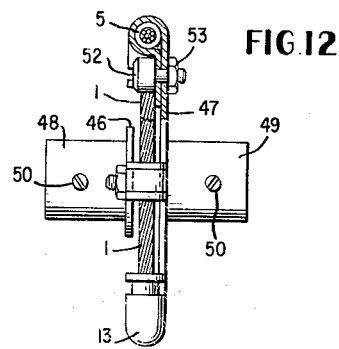
Figure 13:
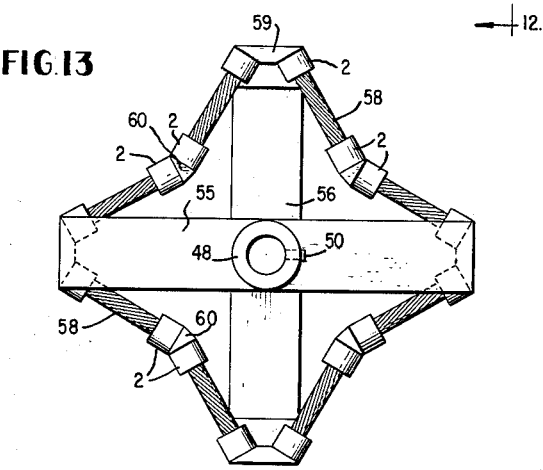
Figure 14:
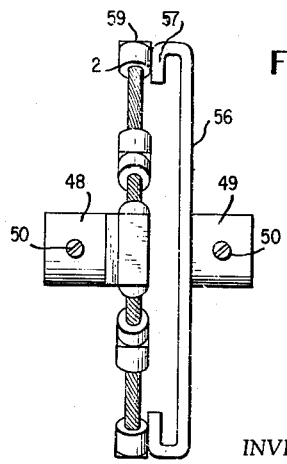

The invention will be further described with respect to the drawings in which:

FIG. 1 shows a square array of cable elements attached by rigid connecting means;
FIG. 2 shows a section of the structure of FIG. 1;
FIG. 3 shows a section of a dual square cable array;
FIG. 4 shows a side view of a vibration isolator mount;
FIG. 5 shows a sectional view of the mount of FIG. 4;
FIG. 6 shows a hexagonal vibration absorbing mount, partially broken away;
FIGS. 7a and 7b are respectively side and sectional views of an alternative construction for cable connector means;
FIGS. 8a and 8b are respectively plan and sectional views of another construction useful as a corner connecting means for positioning the adjacent cable sections at a predetermined angle;
FIG. 9 is a plan view of a single cable array mount having asymetrical hysteresis characteristics;
FIG. 10 is a transverse sectional view of the structure of FIG. 9;
FIG. 11 is a side view of the single cable array torque transmitter vibration isolator;
FIG. 12 is a side view partially in section of the coupling shown in FIG. 11;
FIG. 13 shows another torque transmitter arrangement again employing a single cable configuration;
FIG. 14 is a side view of the structure shown in FIG. 13, and
FIG. 15 shows diagrammatically an application of the cable vibration absorber.

The device shown in FIG. 1 is a composite assembly of four vibration absorbing force transmitting components, similar to one another and easily manufactured. The basic component consists of multistrand resilient cable portions 1 which carry affixed thereto at either end, collar means 2 and central connector collar 5. The multistrand cable comprises twisted monofilaments which, when subjected to transverse vibration, dissipate the vibrational energy in interstrand friction. It is preferred to employ metallic cable, and preferably stainless steel, similar to that used for transmitting forces longitudinally to control surfaces in aircraft. These preferred cables comprise subgroups of monofilaments twisted together, which subgroups are then made up helically to form the complete cable. Thus, the subgroups may comprise, for instance, 19 monofilaments or wires, and 7 of these subgroups may be twisted helically with one another to form a complete cable. The ends of the cable are each received in a bore in the collar 2 to which they are affixed. The attachment may be secured by fusion welding, but preferably the collar is swaged or rolled down to compress the cable. The strength of a swaged collar attachment can be obtained up to 80% of the tensile strength of most cables. The swaged portion of the collar is shown diagrammatically at 4. The cable portion with the attached collars constitutes an important useful element of the present invention, which, as will be seen below, is widely applicable in vibration absorption engineering.

The structure shown in FIG. 1 employs a single length of cable joining the end collars 2, although it may be constructed as an assembly of two half lengths joined together in the bore of central collar 5. In this instance, the central juncture may comprise a fusion weld bond. Further, while the characteristic twist of the cable is the same in all four elements employed in FIG. 1, where half length cable portions are used, reverse twist may be employed. The twist of the cable refers to the twist of the monofilaments, if these are used alone, or the twist of the largest subgroup of monofilaments employed in the cable construction. The twist may be determined by inspection from the appearance of the cable, and in analogy to rope industry terminology, is characteristically defined as S twist or Z twist, as the case may be. S twist is shown in the assembly of FIG. 1.

The four subcomponens of FIG. 1 are assembled in a planar rectangular array by terminal resistance welds of the adjacent collars 2 to right triangular section fillet elements 3. While other forms of attachment could readily be used, resistance welding lends itself to rapid machine production. Other arrangements for connecting the proximate ends of the adjacent cable portions together in the desired angular relationship will be described below.

Centrally of each cable portion is provided means for attaching the mounting plate or other associated attachments. These are collar members 5 which again may be swaged or rolled down on the cable to compress the same and affix the collar thereto. As in connection with the end collars, fusion welding may be employed.

In applications of the structure of FIG. 1, alternate connector means 5 are usually connected together rigidly while the other series of alternate connectors 5 are connected together to a second separate element. Thus, a load may be applied to the vertically aligned connectors 5 in FIG. 1, while a stationary support is rigidly attached to the horizontally aligned connectors 5. In this configuration, the cable elements 1 transmit steady state forces and by interstrand friction substantially attenuate vibrational energy. The length to diameter ratios of the cable sections is limited so that the cable will support the necessary static forces in shear as a transverse load. In the arrangement specifically mentioned, the horizontal cable runs as shown in FIG. 1 would operate in this shear regime as to steady state gravitational forces.

FIG. 2 is a sectional view of a single unit cable array as shown in FIG. 1. FIG. 3 comprises a dual array shown in section wherein the end collars of the cable portions are affixed to and spaced by elongated right triangular fillet sections 6. In this arrangement, the dual construction comprises adjacent connectors 5 which are rigidly attached together and connected as described above to the associated structures.

Referring briefly to FIGS. 7a and 7b, the central connector means, collars 5, would not be initially included in the construction where the connector means is provided by the supporting or supported device itself, which is formed with an extension 8 surrounding the cable portion 1 by a curved length 9 compressed upon the cable and affixed thereto by frictional engagement. As will further appear, extension 8 may form part of a mounting plate.

In FIGS. 8a and 8b is shown an alternate arrangement performing the function of end collars 2 and the right triangular fillet 3. Here the rectangular array would comprise a single integral length of cable 10 received by the curved angle piece 11, at each end which are provided lugs 12 compressed on and affixed to the cable as shown in the drawing. A polygonal array using this type of assembly for the connecting means would normally employ a single length of cable forming the sides of the polygon arranged so that the cable ends would each be received in a lug 12 of the same angle piece 11.

A single unit cable isolator employing the device of FIG. 1 is shown in FIG. 9. Here, the connecting means at the ends of the cable portions are formed intergrally by elbow 13 which terminates in two collars 15 and 16 positioned at the desired angle, in this instance a right angle, and having bores in which the cable is affixed as in the case of terminal collars 2. The central connectors 5 are the same as above described in connection with FIG. 1, and opposite connectors are rigidly joined to the mounting plates. In FIG. 9, the nearer mounting plate 20 is formed from a stamping providing at its opposite edges upturned portions 21 which are terminally compressed at 22 on and around collars 5. Mounting holes 23 are provided for attaching the plate. Extended to the other side of the cable assembly is mounting plate 25 of identical construction affixed to and joining the horizontally aligned connectors.

The isolator unit of FIG. 9 has wide application as a mounting device for transmitting steady state forces while substantially attenuating vibration. It may be applied in any plane, as for instance shown in FIG. 15 where plate 20 may be supported by a floor mount and plate 25 attached to the isolated device. The orientation may be changed as desired, and thus plate 20 could be attached to a horizonal supporting surface above or below the supported device which would then be attached to plate 25 in a horizontal plane.

In the specific cable arrangement shown in FIG. 9, composite cable elements formed of two half length sections of reverse twist are assembled end to end in connectors 5 which are swaged down and affixed thereon. The sections may be fusion welded end to end before the connector is applied. As the mounting plates 20 and 25 are compressed together, frictional forces increase as the cable twists tighter and the monofilaments or sub-assemblies thereof bind together, while the reverse effect takes place as plates 20 and 25 move apart. This asymmetrical hysteresis characteristic provides the engineer with an additional parameter control and is valuable in specialized applications of the isolator.

As mentioned above, isolator units may employ any desired number of the cable assemblies shown in FIG. 1. A dual type isolator is shown in FIGS. 4 and 5 comprising a parallel pair of quadrangular cable assemblies, similar to that of FIG. 3 in most respects. Dual integral elbow units 13 connect the proximate ends of adjacent free cable portions and the adjacent elbows of the two square arrays are connected together as shown at 6 in FIG. 3. This arrangement provides additional cable constraint so that the dual cable isolator is somewhat stiffer than twice the same parameter value for a similar single cable mount.

The dual isolator of FIG. 5 is shown provided with a pair of mounting plates 30 and 31 which perform the same function as plates 20 and 25 of the arrangement shown in FIG. 9. In FIG. 5, however, the connector means are clamped to the legs of the mounting plate between a pair of plates 32 and 33 formed to provide bores frictionally engaging and affixed to the circumference of the collars 5. These plates are riveted at 34 to the upturned lugs 35 of the mounting plates.

As mentioned above, the cable assembly may be generally polygonal with an even number of sides, but not necessarily rectangular. In FIG. 6 is shown a hexagonal array formed of cable elements 1 carrying end collars 2 as described in connection with FIG. 1 above. Instead of right triangular fillets 3, however, in this case equilateral triangular fillets 40 are employed between the terminal collars. The central collars 5 provided in FIG. 1 are also used and alternate connectors are joined by separate mounting plates 41 and 42. Mounting plates 41 and 42 are affixed to the collars 5 as shown in section in FIG. 10. In the specific construction of FIG. 9, unitary lengths of cable 1 are employed having the same twist throughout. Inspection of FIG. 9 shows that longitudinal vibrational components applied at the central connector of a cable portion 1 are not entirely transversely applied to its attached proximate cable portions through fillet 60. Nonetheless, very substantial vibration attenuation does occur due to the angular connection of the adjacent cable portions operating in shear, so long as the angle between the cables is substantially less than 180°, not more than 170°.

As mentioned above, the polygonal cable assembly such as is shown in FIGS. 1 and 3 may be employed to transmit torque between a pair of shafts in an arrangement which attenuates undesired noise components or angular vibrations while at the same time transmitting steady state forces. Of these applications, a very important one is in the drive trains of electric motors which generates severe transients on starting. These peak forces may be very severely attenuated by a drive which includes a polygonal cable array such as here disclosed. In fact, any of the isolators already described, if constructed for rotational balance about the center of the array, could be used in this fashion between the spaced ends of two aligned shafts each terminally welded to the respective mounting plates, such as 30 and 31 of FIG. 5. It has also been discovered, moreover, that such a configuration will accommodate material angular shaft misalignment, the resilience of the cable assembly accommodating to the recurrent relative motion of the two respective mounting plates.

A coupling for transmitting torque between two shafts is illustrated in FIGS. 11 and 12, employing a rectangular cable array of uniform twist with integral angular connecting elbows 13. The pairs of opposite collar members 5 are respectively connected by a pair of plates 46 and 47 carrying collars 48 and 49 for receiving shafts to which they may be attached by set screws 50. As shown in FIG. 12, collars 5 are clamped securely in extensions 51 of the mounting plates by means of bolts 52 and nuts 53.

The torque transmitter of FIG. 11 will absorb high frequency rotational speed irregularities and undesired torsional vibrations between the driving shaft attached to collar 48 and a driven shaft attached in collar 49. Furthermore, this construction will not only accommodate angular shaft relationships such as occur in automotive propeller shafts, it will also accommodate moderate amounts of shaft displacement. In some application, however, other configurations may afford preferred design freedom. One such is shown in FIGS. 13 and 14.

The torque transmitter or shaft coupling shown in these figures is particularly useful in applications where heavy torque loads or heavy peak torque loads are encountered. Here, collars 48 and 49 are provided with set screws 50 for attachment to the proximate ends of a pair of shafts. As in connection with the embodiment of FIG. 11, this coupling is reversible and the shafts may interchange their direction of power transmission, as in an automotive drive.

Collar 48 is affixed to plate 55 and collar 49 to plate 56. Each plate is provided with a reentrant formed portion 57, as best shown in FIG. 14. In this construction the polygonal cable array comprises eight free cable portions 58 provided with diagrammatically shown terminal collars 2, as described in connection with the construction of FIG. 1. At their attachment adjacent the plates 55 and 56, fillet 59 is resistance welded to the ends of the collars 2 and to plate portions 57. The connecting means between the free ends of the adjacent cable portions is formed by an angular fillet 60, also resistance welded to its contiguous collars 2. Fillet 60 is of triangular section having its smallest included angle at 10° or greater. Under normal operation design loads are accepted by this torque transmitter such that it operates with a substantial proportion of total force transmitted by cable in shear in a bending regime. Under unusual or peak loads, however, extremely high torque can be delivered through the coupling without danger of permanent deformation of the cable.

In comparing the respective constructions of FIGS. 11 and 13, the former will accommodate much higher shaft angular misalignment with optimum performance up to 30°, but developing relative shaft errors of a few degrees. The arrangement shown in FIG. 13, however, is not well adapted for angular misalignment much above 5°, but such misalignment produces only fractional degree variation in position of the driven shaft with respect to the driving shaft.

In summary, it will be seen that I have invented a free cable element, of a length to diameter ratio for supporting transverse loads carrying affixed terminal collars and a central connector collar, which is of wide application in vibration isolation technology. The polygonal array of planar construction comprising an even multiplicity of these elements may be directly incorporated in a wide variety of vibration isolating force transmitting configurations. The associated structure may be directly attached to the free cable portions if the central connector collars are not used in the array. Structures including the polygonal cable array may be used as vibration isolator mounts, torque transmitters and in many other applications.

Thus, a plurality of mounts such as shown in FIG. 4 may be stacked one upon the top of another, plate 30 of one mount being attached to plate 31 of the adjacent one, and so forth. Such a configuration, or a stacked series of units as shown in FIG. 6, may be employed as a shock absorbing spring in place of the helical spring commonly used in automotive applications in conjunction with a hydraulic shock absorber. My composite construction performs the function both of the spring and the hydraulic device.

Another interesting application of the isolator mounts shown in FIGS. 4 and 10 is their use in connection with spring or rubber mounted machinery. In these applications, the gravitational load of a machine may be carried by conventional resilient arrangements of rubber or flexible metal springs. When a cable mount of the configuration shown in the referred to figures is applied in parallel with the resilient material, it has been found that the vibration absorption characteristics of mounts of the present invention will dissipate very high percentages of the vibrational energy in the system, despite the fact that the cable mount may be under an average load which is a very small percentage of the steady state load on the other resilient material of such a composite arrangement. In fact, in experimental installations internal cable friction dissipating the vibrational energy received by the cable mount has developed steady state cable temperatures above the range of safe bodily contact. In industrial applications, of course, the cable dissipation system would be designed to avoid such temperatures, or suitable safety shields included to prevent accidental human contact with the cable isolator structure.

Such an arrangement is illustrated in FIG. 15, where a portion 65 of a motor driven machine tool, such as a shaper, is shown with one of its supporting brackets 66. Spring 67 supports the main steady state load from floor mount 68. The cable isolator (FIG. 10) has plate 20 welded to the top of bracket 66. Its upper plate 25 carries a welded threaded stud positioned in a bore in arm 70 of the floor mount. Stud 69 may be adjusted by nuts 71 to put the cable isolator in the desired tension, or compression, or in unstressed condition. The optimum condition is empirically determined by adjustment during machine operation to minimize ts vibration amplitude. In many situations, a relatively small cable isolator will dissipate the vibrational energy in a large machine when properly adjusted in this arrangement.

I claim:

1. A vibration absorbing force transmitting coupling comprising a plurality of resilient twisted monofilament cable elements of uniform length, a plurality of rigid angular connecting means fixedly interconnecting said cable elements in end-to-end relationship with each other with a uniform angle included between adjacent cable elements to define a closed regular polygonal cable array having sides defined by said cable elements and corners defined by said angular connecting means, a pair of like mounting members, first means fixedly securing one mounting member to the respective mid-points of alternate sides of said cable array, and second means fixedly securing the other mounting member to the respective mid-points of the remaining sides of said cable array.

2. A coupling as defined in claim 1 wherein each of said sable elements comprises a single length of cable having a collar fixedly secured thereon at the mid-point of the length of cable, said collar constituting a portion of the means for fixedly securing said mounting members to said cable array.

3. A coupling as defined in claim 1 where each of said cable elements comprises two lengths of cable fixedly coupled to each other in end-to-end relationship by said means for fixedly securing the mounting members to said cable array, each pair of cable lengths constituting one side of said polygonal array, the monofilaments of one of each pair of cable lengths being twisted in one direction, and the monofilaments of the other length of each pair being twisted in the opposite direction.

4. A vibration absorbing force transmitting coupling comprising a plurality of resilient twisted monofilament cable elements of uniform length, a plurality of rigid angular connecting means rigidly interconnecting said cable elements in end-to-end relationship with each other to define a closed symmetrical polygonal cable array having sides defined by said cable elements and corners defined by said angular connecting means, the angles at the interior of said polygonal array being alternately acute and obtuse, a first mounting member rigidly connected to two of said angular connecting means at diametrically opposite corners of said cable array, and a second mounting member rigidly connected at its opposite ends to two of said angular connecting means diametrically opposed to each other at corners of said cable array midway between the corners to which said first mounting member is connected.

5. A vibration absorbing force transmitting coupling comprising a plurality of resilient cable elements of uniform length, a plurality of rigid angular connecting means rigidly interconnecting said cable elements in end-to-end relationship with each other with a uniform angle included between adjacent cable elements to define a closed regular polygonal cable array having sides defined by said cable elements and corners defined by said angular connecting means, each angular connecting means having at least four cable elements fixedly secured thereto with the cable elements extending between adjacent connecting means in spaced parallel relationship with each other whereby each side of said cable array is constituted by at least two cable elements in parallel relationship with each other, a first mounting member fixedly secured to the mid-points of all cable elements constituting two opposed sides of said cable array, and a second mounting member fixedly secured to the mid-points of all cable elements constituting a second pair of opposite sides of said cable array.

6. A vibration absorbing force transmitting coupling comprising a plurality of wire cable elements of uniform length, a plurality of rigid angular connecting means rigidly interconnecting said cable elements in end-to-end relationship to each other with a uniform angle included between adjacent cable elements to define a closed regular polygonal cable array lying in a general plane having sides defined by said cable elements and corners defined by said angular connecting means, means defining a first mounting member fixedly secured to the respective mid-points of alternate sides of said cable array, means defining a second mounting member fixedly secured to the respective mid-points of the remaining sides of said cable array, means on each mounting member for fixedly coupling a rotary member to said mounting member for rotation about an axis passing substantially through the center of said polygonal array in substantially perpendicular relationship to said general plane, said cable elements being operable to flex and twist to accommodate longitudinal and angular misalignment of the axes of said rotary members.

References Cited by the Examiner

UNITED STATES PATENTS

| | | | |
|---|---|---|---|
| 203,739 | 5/78 | Kilburn | 267—1 |
| 322,866 | 7/85 | Tabor | 64—12 |
| 1,643,110 | 9/27 | Briggs | 24—123 |
| 1,680,548 | 8/28 | Keiser | 256—13.1 |
| 2,566,575 | 9/51 | Mann | 64—12 |
| 2,635,133 | 4/53 | Badeau | 24—123 X |
| 2,652,231 | 9/53 | Smith | 24—122.6 |
| 2,915,879 | 12/59 | Besse | 256—13.1 X |
| 3,074,681 | 1/63 | Kerley | 267—1 X |

FOREIGN PATENTS

| | | |
|---|---|---|
| 365,351 | 1/32 | Great Britain. |

ARTHUR L. LA POINT, *Primary Examiner.*